Oct. 2, 1928.
C. W. SÖDERBERG
1,686,474
SELF BAKING ELECTRODE
Filed Sept. 18, 1926
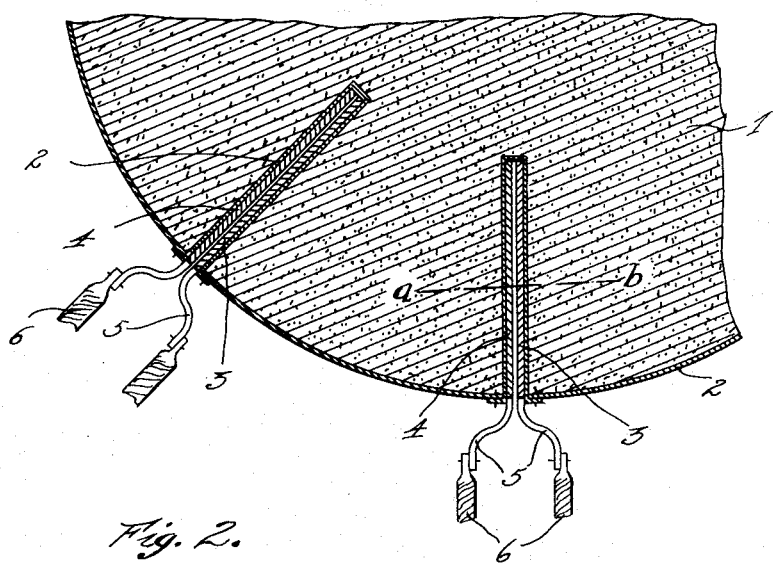
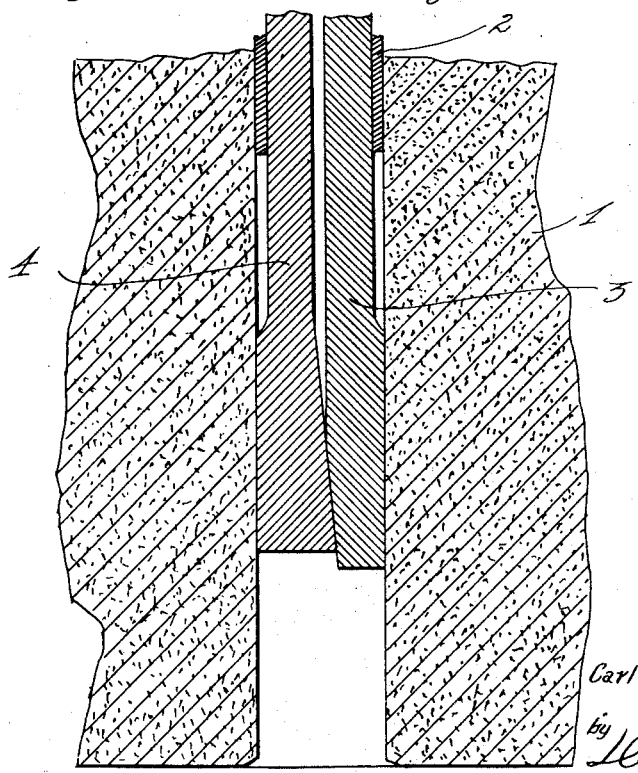
Inventor.
Carl Wilhelm Söderberg
Attorneys.

Patented Oct. 2, 1928.

1,686,474

UNITED STATES PATENT OFFICE.

CARL WILHELM SÖDERBERG, OF OSLO, NORWAY, ASSIGNOR TO DET NORSKE AKTIE-SELSKAB FOR ELEKTROKEMISK INDUSTRI OF NORWAY, OF OSLO, NORWAY.

SELF-BAKING ELECTRODE.

Application filed September 18, 1926, Serial No. 136,275, and in Norway September 19, 1925.

The so-called self-baking electrodes, i. e. electrodes that are baked while in use in the electric furnace, ordinarily consist of one baked and one unbaked part and means will have to be provided for conducting the electric current to the baked part of the electrode. A present this is ordinarily made according to my U. S. Patent No. 1,440,724 dated January 2nd, 1923, by surrounding the electrode by a metallic shell structure consisting of a metal mantle provided with inwardly projecting ribs that give a good electrical contact. Both casing and ribs pass into the furnace as the electrode is consumed and become a part of the charge. In many instances the presence of this metal, which on account of the high temperature required to properly bake the electrode is generally iron, is not objectionable. However, where the continuous self-baking electrodes are to be used in the electrolytic production of aluminum and in similar cases, the addition of iron from the electrode is very objectionable as it renders the aluminum impure. For this reason as much as possible of the shell structure may be made of aluminum, but inasmuch as the aluminum melts at a temperature considerably below that at which the electrode has attained a reasonably good electrical conductivity, the use of aluminum for the whole shell has met with difficulty so that the internally projecting ribs are now generally made of iron or other comparatively difficultly fusible metal (U. S. Pat. 1,679,284 of Jens Westly), which remains solid and conducts the current to a point far enough down in the electrode so that the voltage losses in the electrode do not become too large a factor in the power consumption of the furnace. These inwardly projecting ribs, however, although very thin, introduce an appreciable and undesired amount of iron into the aluminum produced.

The object of the present invention is to provide a shell structure for a self-baking electrode, in which the mantle—if any—may be made of an easily fusible metal such as aluminum and the ribs may be made of a difficultly fusible metal such as iron, where the ribs may be given a sufficient cross-section so that the voltage loss in them is materially reduced as compared with that in the ribs previously employed, and where the metal in these ribs is not permitted to enter the furnace and contaminate the product. This is accomplished by separating the ribs from the shell so that they are mechanically independent of each other and may be displaced with relation to each other, especially in a direction parallel to the axis of the electrode. Thereby the ribs are converted into special contacts inserted into or in other ways brought in contact with the baked part of the electrode. If a metallic mantle is used, which encloses and shapes the electrode, the same may therefore pass into the furnace with it, while the ribs may be so arranged that they carry a large part of the current to the thoroughly baked lower portion of the electrodes, but are not permitted to be fed into and consumed in the furnace. Thus the mantle may be made of an easily fusible metal, such as aluminum, and the ribs of a more difficultly fusible metal such as iron, without contaminating the furnace product with the difficultly fusible metal. Since the invention is of particular importance in the use of the continuous self-baking electrode for the production of aluminum by the electrolyses of its oxide in a molten bath, the example chosen for description will refer particularly to such an electrode, although it should be clearly understood that the invention is also applicable to other cases where similar requirements have to be met.

In the attached drawing Fig. 1 shows a horizontal section through an electrode in which this invention is embodied, and Fig. 2 shows an enlarged vertical section along the line a—b of Fig. 1.

In these drawings 1 is electrode mass, 2 is an aluminum mantle which, as will be seen, is bent inwardly into the electrode mass to give room for the ribs 3 and 4, which are of iron. The ribs have an externally extending portion 5 where the electric cables 6 may be connected. As appears from Fig. 2 the ribs are made of two parts 3 and 4, which are wedge-shaped in such a way that a blow on one part of the rib will cause the ribs to be wedged against the surrounding material and consequently make a good electrical contact. It is most advantageous to arrange the shell so that the lower ends of the iron ribs are so close to the fused bath that the aluminum mantle is melted off at this point. The ribs will then be attached directly to the already-baked electrode mass and loss of voltage is thus practically avoided. The ribs are made so long that they project above the upper end of the mantle. When the lower end of the rib approaches the melt, the rib is loosened by a blow on one part of its upper end and the whole rib is pulled upwards a suitable distance. It is thus possible to move one rib at a time and the operation of the furnace may at all times be continued without disturbance. The mantle is made from sections which are previously formed and placed in the position shown with reference to the ribs, and joined to each other by welding. The tamping of the electrode mass takes place as is usual with self-baking electrodes and the electrode may be supported in any known way. The ribs should be suspended from their upper part. The lower end of the ribs will always take the temperature of the electrode at this point, that is about 900° C. and must therefore be provided with a non-oxidizable coating of ferrochromium or the like. To get the best possible contact the ribs may increase in thickness, both towards their lower end where the aluminum mantle melts, and inwardly towards the axis of the electrode. The supply of current may of course take place in the usual manner through the carrying mechanism of the electrode as well as through the ribs. If desirable, the mantle may of course be provided with projections or the like to provide better attachment for the electrode mass.

Obviously the mode of application of the present invention may be varied within wide limits and the above example therefore is not intended to limit the invention.

Claims:

1. The combination of an electrode baked while in use in the electric furnace, an electrode holder, and a current-carrying contact movable relatively to the electrode and the electrode holder.

2. The combination with an electrode baked while in use in the electric furnace, of a metallic current-carrying contact extending into the electrode beyond the periphery thereof and movable relatively to the electrode.

3. The combination with an electrode baked while in use in the electric furnace, of a plurality of current-carrying contacts extending into the electrode beyond the periphery thereof, such contacts being movable relative to each other.

4. The combination with an electrode baked while in use in the electric furnace, of a current-carrying contact extending into the electrode beyond the periphery thereof, such contact comprising parts relatively displaceable with respect to each other, and adapted when so displaced to engage the electrode to make contact therewith.

5. The combination with an electrode baked while in use in the electric furnace, of a current-carrying contact extending into the electrode beyond the periphery thereof, such contact comprising a plurality of movable wedge-shaped parts.

6. The combination with an electrode baked while in use in the electric furnace, of a metallic current-carrying contact extending into the electrode beyond the periphery thereof and movable relatively to the electrode, the lower portion of such contact being provided with a non-oxidizing coating.

7. The combination with an electrode baked while in use in the electric furnace, of a current-carrying contact extending into the electrode beyond the periphery thereof, such contact comprising a plurality of relatively movable parts suspended from their upper ends.

8. The combination with and electrode baked while in use in the electric furnace, of a current-carrying contact extending into the electrode beyond the periphery thereof and movable relatively to the electrode, and an electric lead directly connected with such contact.

9. A metal shell for an electrode baked while in use in the electric furnace characterized by the fact that it comprises a plurality of mechanically distinct parts movable relatively to each other.

10. A metal shell for electrodes baked while in use in the electric furnace comprising a mantle containing the electrode mass, and ribs displaceable with respect to the mantle.

11. A metal shell for electrodes baked while in use in the electric furnace comprising a mantle containing the electrode mass and ribs displaceable with respect to the mantle, the mantle being made of a relatively easily fusible metal and the ribs being made of comparatively difficulty fusible metal.

12. A metal shell for electrodes baked while in use in the electric furnace comprising a mantle containing the electrode mass, and ribs displaceable with respect to the mantle, the mantle being made of aluminum and the ribs being made of iron.

13. A metal shell for electrodes baked while in use in the electric furnace, comprising an aluminum mantle containing the electrode mass, and a movable iron rib comprising parts relatively displaceable with respect to each other and adapted when so displaced to engage the electrode to make contact therewith.

14. A metal shell for an electrode baked while in use in the electric furnace comprising an aluminum mantle, and an iron current-carrying contact extending into the electrode beyond the periphery thereof, such contact comprising a plurality of wedge-shaped parts.

15. A metal shell for an electrode baked while in use in the electric furnace comprising a mantle made of a relatively easily fusible metal, and a current-carrying rib of comparatively difficulty fusible metal extending into the electrode beyond the pehiphery thereof, the lower part of such rib being provided with a non-oxidizable coating.

16. A metal shell for an electrode baked while in use in the electric furnace comprising a mantle of one composition, and a rib movable relatively to the mantle and made of another composition, the rib being suspended from its upper end.

17. A metal shell for an electrode baked while in use in the electric furnace comprising a mantle of a relatively easily fusible metal and ribs displaceable with respect to the mantle and made of a comparatively difficultly fusible metal, and electric leads directly contacting with such ribs.

CARL WILHELM SÖDERBERG.